Figure 1:
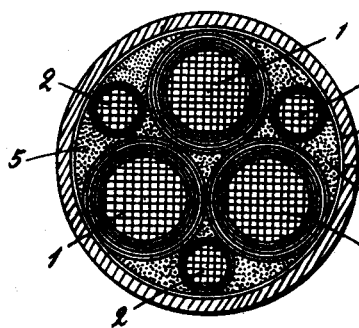
Figure 2:
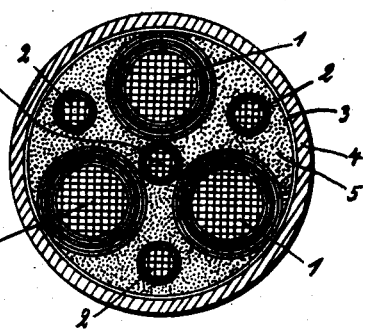
Figure 3:
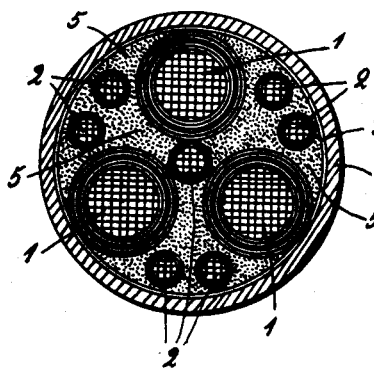
Figure 4:
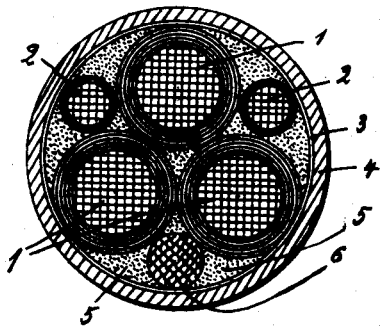

No. 682,845. Patented Sept. 17, 1901.
W. B. ESSON.
ELECTRIC CABLE FOR THREE-PHASE ALTERNATING CURRENTS.
(Application filed July 22, 1901.)
(No Model.)

Witnesses.
Wilhelm Vogt
Thomas M. Smith

Inventor.
William Berdie Esson,
By J. Walter Douglas
Attorney.

UNITED STATES PATENT OFFICE.

WILLIAM BEEDIE ESSON, OF LONDON, ENGLAND.

ELECTRIC CABLE FOR THREE-PHASE ALTERNATING CURRENTS.

SPECIFICATION forming part of Letters Patent No. 682,845, dated September 17, 1901.

Application filed July 22, 1901. Serial No. 69,177. (No model.)

*To all whom it may concern:*

Be it known that I, WILLIAM BEEDIE ESSON, a subject of the King of Great Britain, and a resident of London, in the county of Middlesex, England, have invented certain new and useful Improvements in or Connected with Electric Cables for Three-Phase Alternating Currents, of which the following is a specification.

My invention relates to the construction of conducting-cables for the transmission and distribution of electric energy by alternating currents of three phases. For the transmission or distribution of such currents three conductors are generally employed, the light or power circuits being connected between any two of the adjacent conductors. If a fourth or neutral conductor is added to these three principal conductors, an improved electrical balancing of the system is effected, the circuits in this case being connected between any one of the three conductors and the neutral conductor. With only three conductors there is on the consumer's premises the full difference of potential between the conductors; but with the fourth or neutral conductor added the difference of potential on the consumer's premises for lighting-circuits is the pressure between any one of the three principal conductors and the neutral conductor.

From the above it follows that if in each case the difference of potential on the consumer's premises is the same the pressure between the three principal conductors can with the addition of a neutral conductor be increased over the pressure with three conductors only in the ratio $\sqrt{3} : 1$, and the currents being generated at a higher pressure a great saving of copper may be effected in the mains.

My invention consists in the division of the fourth conductor above referred to and in its diposition relatively to the three principal conductors. By this disposition I keep the outside diameter of the cable small, insuring at the same time that all the conductors are easily accessible.

In order that the scope of my invention may be more readily understood, I append hereto a sheet of drawings showing in what manner it is to be or may be carried into effect.

In the figures of the said drawings, Figure I illlustrates a case in which the fourth or neutral conductor is divided into three separated wires or constituent conductors. Fig. II illustrates a case in which the fourth or neutral conductor is divided into four separated wires or constituent conductors. Fig. III illustrates a case in which the fourth or neutral conductor is divided into seven separated wires or constituent conductors. Fig. IV illustrates a case in which the fourth or neutral conductor is divided into two separated wires or constituent conductors.

In the said figures, 1 1 1 are the three principal conductors hereinbefore mentioned, these being suitably insulated and laid or twisted together in any of the well-known ways, and the fourth or neutral conductor is divided into the separate wires or constituent conductors, as shown.

In Fig. I the fourth or neutral conductor is formed by the three separated wires or constituent conductors 2 2 2, these being placed in the positions shown—that is to say, each in the external recess formed between two contiguous principal conductors, so that, like the principal conductors, they are disposed in triangular form. In manufacturing the cable the separated constituent conductors are laid or twisted along with the three principal conductors and may or may not be separately insulated. If separately insulated, the covering may be less heavy than that of the principal conductors. The cable thus formed of three principal conductors and the three constituent conductors, which combined together form the neutral conductor, may be covered on the exterior with tape 3 and lead 4 and the space 5 between the conductors and the lead packed with jute or such other filling as it is used in cable-making. The three constituent conductors 2 2 2 may be united at each joint-box by inserting their three ends into a common metal ring—for example, the connection being made from the neutral wire to the consumer's premises by any suitable attachment. The consumer's connection to the principal conductors may be made by removing the insulation and employing an ordinary T-joint.

In Fig. II the neutral conductor is shown as divided into four constituent conductors, three of them occupying the same positions as the constituent conductors in Fig. I, but the fourth constituent conductor occupying a central position.

In Fig. III the fourth or neutral conductor is shown as divided into seven constituent conductors, one of these being central and the other six arranged in three pairs, each pair corresponding in position with the constituent conductors in Fig. I.

A considerable number of variations in the disposition of the constituent conductors of the neutral conductor may be made. For example, instead of having a simple central constituent conductor, as in Figs. II and III, three constituent conductors may be placed in this central position. Again, instead of having the outer constituent conductors of the neutral conductor arranged in pairs, as in Fig. III, they might be arranged in threes.

In the cases hereinbefore mentioned the disposition of the constituent conductors of the neutral conductor is in all cases symmetrical; but they might be arranged in unsymmetrical form, the symmetry being restored, for example, by the insertion of a rope or other dummy. Such a case is shown in Fig. IV, where 6 represents a rope inserted so as to make a symmetrical disposition with the constituent conductors 2 2.

Having thus described my invention, what I claim as new, and desire to secure by Letters Patent, is—

1. In an electric cable for three-phase alternating currents, three principal conductors and a fourth or neutral conductor divided into a series of separate wires arranged between the principal conductors and insulated therefrom.

2. In an electric cable for three-phase alternating currents, the combination of three principal conductors and a fourth or neutral conductor divided into two or more constituent conductors, the said constituent conductors lying between the principal conductors.

3. In an electric cable for three-phase alternating currents, the combination of three principal conductors and a fourth or neutral conductor divided into two or more constituent conductors the said constituent conductors being unsymmetrically disposed substantially as set forth.

4. In an electric cable for three-phase alternating currents, the combination of three principal conductors, a fourth or neutral conductor divided into two or more constituent conductors, and a dummy or dummies the said dummy or dummies and the said constituent conductors together constituting a symmetrical arrangement or disposition substantially as set forth.

In witness whereof I have hereunto set my hand in presence of two witnesses.

WILLIAM BEEDIE ESSON.

Witnesses:
CHARLES WRIGHT DHRUFORD,
FRANK KEMP WESTBROOK.